(12) United States Patent
Robinson et al.

(10) Patent No.: US 7,990,675 B2
(45) Date of Patent: Aug. 2, 2011

(54) MONOLITHIC SOLID STATE RELAY CIRCUIT FOR TELECOM WIRELINE APPLICATIONS

(75) Inventors: Michael L. Robinson, Plano, TX (US); Kwok Lee, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 2 days.

(21) Appl. No.: 12/403,110

(22) Filed: Mar. 12, 2009

(65) Prior Publication Data

US 2009/0168992 A1  Jul. 2, 2009

Related U.S. Application Data

(63) Continuation of application No. 10/930,089, filed on Aug. 31, 2004.

(51) Int. Cl.
*H02H 1/00* (2006.01)
(52) U.S. Cl. .......................................... 361/119
(58) Field of Classification Search ............ 361/119
See application file for complete search history.

(56) References Cited

U.S. PATENT DOCUMENTS

| | | | |
|---|---|---|---|
| 5,654,574 A | 8/1997 | Williams et al. | |
| 5,841,996 A | 11/1998 | Nolan et al. | |
| 6,311,245 B1 | 10/2001 | Klein | |
| 6,462,434 B1 | 10/2002 | Winick et al. | |
| 6,590,412 B2 * | 7/2003 | Sunter | 324/771 |
| 6,611,169 B2 | 8/2003 | Mendenhall | |
| 6,639,771 B2 * | 10/2003 | Li | 361/56 |
| 6,778,529 B1 | 8/2004 | Field et al. | |
| 6,862,622 B2 | 3/2005 | Jorgensen | |
| 2003/0107855 A1 | 6/2003 | Hsu et al. | |
| 2004/0062059 A1 * | 4/2004 | Cheng et al. | 363/17 |
| 2004/0088464 A1 | 5/2004 | Parameswaran | |
| 2004/0123166 A1 | 6/2004 | Gauthier et al. | |

FOREIGN PATENT DOCUMENTS

| | | |
|---|---|---|
| JP | 11004485 A | 1/1999 |
| JP | 2006322786 A * | 11/2006 |

OTHER PUBLICATIONS

Integrated Device Technology, Inc. IDTQS3VH251 Quickswitch Products 2.5V/3.3V 8:1 Mux/Demux High Bandwidth Bus Switch, Aug. 2002, pp. 1-3, 6.
Texas Instruments Incorporated, TS5N118 1-of-8 FET Multiplexer/Demultiplexer High-Bandwidth Bus Switch, Aug. 2005, pp. 1-3.
www.cisco.com/warp/public/63/arch12000-lcdesign, Cisco 12000 Series Internet Router Architecture: Line Card Design.

* cited by examiner

*Primary Examiner* — Jared J Fureman
*Assistant Examiner* — Ann T Hoang
(74) *Attorney, Agent, or Firm* — Edell, Shapiro & Finnan, LLC

(57) ABSTRACT

Methods and apparatus for utilizing a solid state relay arrangement as a part of a protection scheme for a telecom wireline card suitable are disclosed. According to one embodiment, a line card that is suitable for use in an optical network device includes an electrical port, a plurality of input lines, an output line, and protection circuitry. The protection circuitry switches or multiplexes the plurality of input lines into the output line, and includes a solid state relay arrangement and power isolation circuitry. The power isolation circuitry provides a high impedance to power rails associated with the solid state relay arrangement, and the solid state relay arrangement includes at least one N-channel field effect transistor (FET), at least one protection diode, and at least one charge pump.

18 Claims, 7 Drawing Sheets

MONOLITHIC SOLID STATE RELAY CIRCUIT FOR TELECOM WIRELINE APPLICATIONS

RELATED APPLICATIONS

This application is a continuation of U.S. patent application Ser. No. 10/930,089, filed on Aug. 31, 2004, the entirety of which is incorporated herein by reference.

BACKGROUND OF THE INVENTION

1. Field of Invention

The present disclosure relates generally to network systems. More particularly, the present disclosure relates to enabling a solid state relay arrangement to effectively replace multiple electromechanical relays in a wireline protection scheme.

2. Description of the Related Art

The demand for data communication services is growing at an explosive rate. Much of the increased demand is due to the fact that more residential and business computer users are becoming connected to the Internet. To address the demand for data communication services, the use of optical networks, such as a synchronous digital hierarchy (SDH) network or a synchronous optical network (SONET), is becoming more prevalent.

Within networks, line cards are typically used in multiservice platforms which provide electrical to optical interfaces. The line cards generally utilize telecom wireline applications or, more specifically, telecom wireline protection schemes. Telecom wireline protection schemes often utilize a series of double pole double throw (DPDT) electromechanical relays (EMRs) to provide varying equipment protection schemes.

FIG. 1 is a diagrammatic representation of a line card which utilizes a series of EMRs for an equipment protection scheme. A line card 100 includes a plurality of ports 124 which are each arranged to receive a single line from a multiplexing arrangement. By way of example, port 124a is coupled to a line 120 which is processed by a protection switching arrangement of DPDT EMRs 104a-f in a one-for-five protection scheme. Inputs 108, of which one may be considered to be working while five are protected, to EMRs 104a-c are selected by EMRs 104a-c such that output lines 112b-d of EMRs, along with a loopback line 112a, are passed into EMRs 104d, 104e. As will be appreciated by those skilled in the art, each EMR 104 is arranged to switch two input lines into a single output line. Each EMR 104d, 104e effectively switches a pair of lines 112 into single lines 116 which, in turn, are switched by EMR 104f into line 120 which is coupled to port 124a.

Often, a line card may include a plurality of ports, each of which uses approximately N+1 DPDT EMRs, where "N" is a number of protected ports in a telecom protection scheme. Hence, the amount of space on a line card that is occupied by EMRs is often significant. Additionally, the physical size of each EMR is typically relatively large. In some instances, as for example in the case of relatively high density electrical line cards such as DS1, DS3, E1, ES, STM1E, and other line cards, it may not always be possible to fit all the EMRs needed to perform protection switching on the line cards due to space constraints. Since line cards and platforms on which the protection schemes are used are rapidly becoming denser in terms of the number of electrical ports supported on line cards and by platforms, the lack of available space on a line card for use in implementing protection schemes is becoming more prevalent, i.e., more design difficulties are arising when it comes to workable telecom wireline protection schemes which utilize multiple EMRs.

Further, since EMRs are typically relatively expensive, the use of multiple EMRs in a telecom wireline protection scheme on a line card may significantly impact the direct costs associated with the line card. Also, the reliability of EMRs is often questionable, e.g., EMRs are typically less reliable than other types of relays such as solid state relays. As such, the use of multiple EMRs may be impractical for at least the reasons that the amount of space needed on a line card in order to implement the EMRs is often substantial due to the size of the EMRs and the volume of EMRs, the cost of EMRs is relatively high, and the reliability of EMRs may be suspect.

Therefore, what is needed is a method and an apparatus which allows protection switching to be performed on telecom wires without requiring a significant amount of space on a line card. That is, what is desired is a system which effectively performs substantially the same function as multiple DPDT EMRs in a telecom wireline protection scheme on a line card, but occupies less space on a line card than the DPDT EMRs.

SUMMARY OF THE INVENTION

The present disclosure relates to a protection scheme for a telecom wireline card suitable for use in a telecom transport device with electrical wireline connections that uses solid state relays. According to one embodiment, a line card that is suitable for use in an optical network device includes an electrical port, a plurality of input lines, an output line, and protection circuitry. The protection circuitry switches or multiplexes the plurality of input lines into the output line, and includes a solid state relay arrangement and power isolation circuitry. The power isolation circuitry provides a high impedance to power rails associated with the solid state relay arrangement, and the solid state relay arrangement includes at least one N-channel field effect transistor (FET), at least one protection diode, and at least one charge pump.

In one embodiment, the power isolation circuitry includes a first FET, a second FET, and a comparator. The first FET is located between the ground line and the solid state relay arrangement, and the second FET is located between a non-positive voltage line and the solid state relay arrangement. The comparator is arranged to turn on the first and second FETs. In another embodiment, the power isolation circuitry includes an electromechanical relay arrangement and a comparator. The electromechanical relay arrangement is arranged between the solid state relay arrangement and the power supply, the comparator is arranged to turn on the electromechanical relay arrangement.

The use of a solid state relay arrangement that includes N-channel FETs instead of multiple electromechanical relays to provide a protection scheme on a wireline line card suitable for use in a multiservice platform allows the amount of space needed on the line card by a protection scheme to be significantly reduced. In addition, the use of a solid state relay arrangement increases the reliability and typically reduces the costs associated with implementing a protection scheme. By providing power isolation circuitry to support a solid state relay arrangement of a protection scheme, the effect of bipolar signals self-biasing the switch and leakage current may be minimized. Hence, a line card with the protection scheme may be hot inserted into a system substantially without disrupting existing shared traffic.

According to another embodiment, a multiservice platform that is suitable for use in a network includes a power source and a telecom wireline line card that is coupled to the power source and includes an electrical port, at least one input line, an output line coupled to the electrical port, and protection circuitry. The protection circuitry effectively switches one of many input lines into a input line into the output line, which may be one of many, and includes a solid state relay arrangement and power isolation circuitry. The power isolation circuitry provides a high impedance to power rails associated with the solid state relay arrangement, wherein the solid state relay arrangement includes at least one N-channel FET, at least one protection diode, and at least one charge pump.

In accordance with another embodiment, a method for processing a signal using a telecom wireline line card includes receiving the signal on an input line of the line card, and switching the signal using a solid state relay arrangement of the line card. The solid state relay arrangement includes at least one FET, a charge pump, and at least one protection diode. The solid state relay arrangement is coupled to a power isolation circuit arranged to provide a high impedance to power rails associated with the solid state relay arrangement. The method also includes providing the signal to an electrical port of the line card after the signal is switched using the solid state relay arrangement. In one embodiment, the input line is coupled to a first clamp diode on a positive voltage line and to a second clamp diode on a negative voltage line.

BRIEF DESCRIPTION OF THE DRAWINGS

The invention may best be understood by reference to the following description taken in conjunction with the accompanying drawings in which.

DETAILED DESCRIPTION OF THE EMBODIMENTS

While the use of electromechanical relays (EMRs) in telecom wireline protection schemes is generally effective, the amount of space needed to implement the EMRs in a wireline protection scheme is typically relatively significant. Many line cards are becoming more dense and, hence, it is becoming more difficult to fit multiple EMRs on the line card. Additionally, the cost of EMRs may be high, and the reliability of EMRs may be questionable.

By utilizing solid state relay arrangements for telecom wireline protection switching, the amount of space needed to implement protection switching on line cards may be significantly reduced. For example, a single solid state relay arrangement that serves as an 8-to-1 multiplexer may effectively replace an arrangement that includes up to approximately seven double pole double throw (DPDT) EMRs. Solid state relays are also typically less expensive then EMRs, and are significantly more reliable. Hence, the use of a solid state relay arrangement for protection switching is often more practical than the use of EMRs for protection switching, particularly when space on a line card is at a premium.

Figure 1:
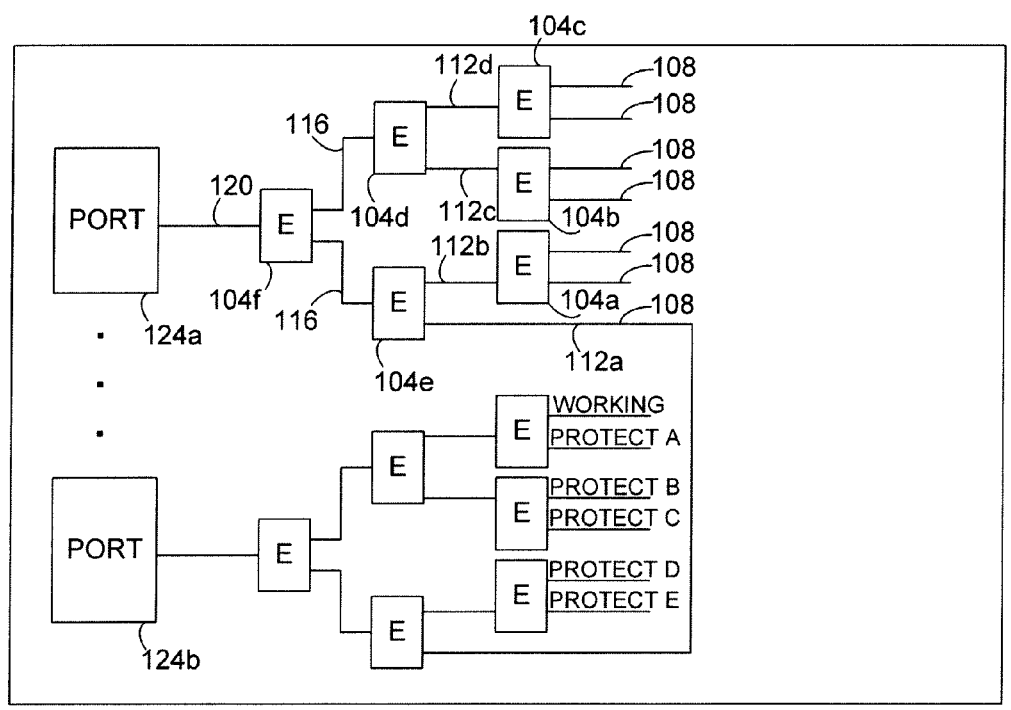
FIG. 1 is a diagrammatic representation of a line card which utilizes a series of EMRs for an equipment protection scheme.
Figure 2:
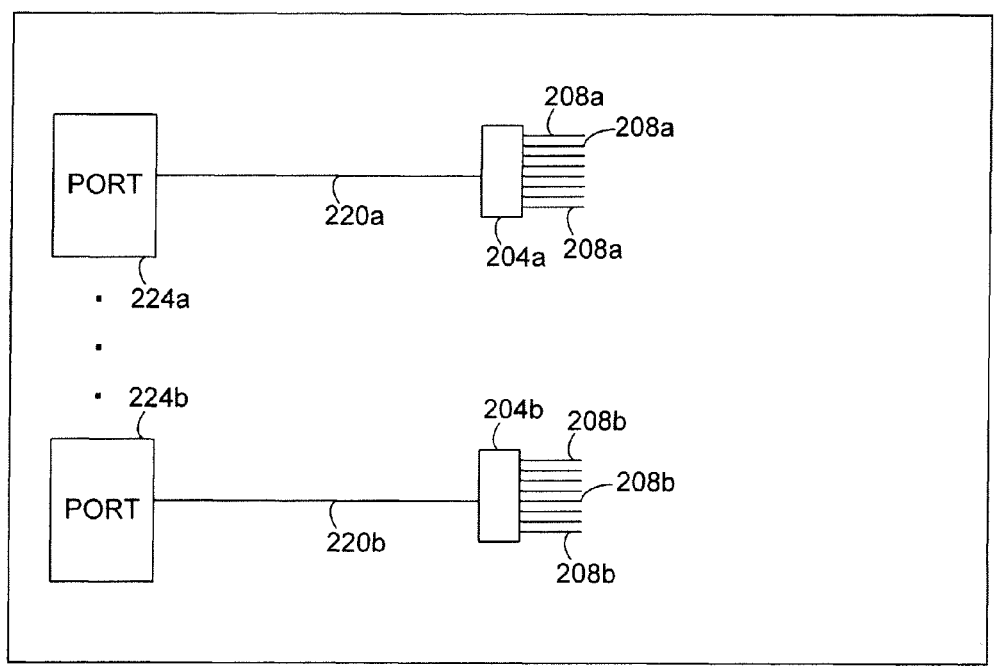
FIG. 2 is a diagrammatic representation of a line card which uses solid state relays to perform protection switching in accordance with an embodiment.

FIG. 2 is a diagrammatic representation of a line card which uses solid state relays to perform protection switching in accordance with an embodiment. A line card 200, which may be used as a component in a multiservice platform such as the ONS 15454 system available from Cisco Systems, Inc. of San Jose, Calif., generally includes a variety of circuitry which allows information to be processed by and passed through line card 200. Such circuitry typically includes, but is not limited to, power management circuitry, SERDES circuitry, framer circuitry, and mapping circuitry. However, for ease of illustration, substantially only ports 224 and solid state relay arrangements 204 are shown. It should be appreciated, however, that ports 224 and solid state relay arrangements 204 are merely a portion of the circuitry supported on line card 200.

Although line card 200 is described as being suitable for use in a multiservice platform, line card 200 is not limited to being used in a multiservice platform. Line card 200 may generally be utilized in substantially any telecom transport device that has electrical wireline connections. Suitable telecom devices in which line card 200 may be used include, but are not limited to, cross connects, add-drop multiplexers, DSLAMs, switches, and routers.

Lines 208 are inputs into solid state relay arrangements 204, which effectively multiplex lines 208 into a single output 220 that is provided to ports 224. Typically, the number of ports 224 may vary widely, as for example from approximately one to approximately sixteen or more. In one embodiment, line card 200 may include approximately twelve ports and may be a twelve port DS3 line card, or line card 200 may include approximately forty eight ports and may be a forty eight port DS3 line card. The number of ports is generally limited by physical space on a line card and power constraints. Hence, substantially any number of ports may be included as a part of line card 200. Each solid state relay arrangement 204 is arranged to be configured to switch lines 208 into a single output 220, e.g., solid state relay arrangement 204a is arranged to multiplex eight inputs 208a into output 220a while solid state relay arrangement 204b is arranged to multiplex eight inputs 208b into output 220b, although it should be appreciated that each solid state relay arrangement may generally receive any number of inputs.

Solid state relay arrangements 204 generally each include pairs of back-to-back field-effect transistors (FETs) with protection diodes and a charge pump, and are suitable for supporting hot-swapping or "hot insertion." That is, solid state relay arrangements 204 generally include an N-channel FET such as a monolithic integrated N-channel twin well FET device with protection diodes and a charge pump built in. Suitable monolithic integrated N-channel twin well FET devices that may be used as a solid state relay arrangement 204 include those in the QS3VH25X family of HotSwitch multiplexer/demultiplexers available from Integrated Device Technology, Inc. It should be appreciated, however, that solid state relay arrangements such as those in the QS3VH25X are merely examples of suitable solid state relay arrangements, and that a variety of other solid state relay arrangements which include a charge pump and protection diodes may instead be used. One other type of solid state relay arrangement may be the TS5Nxxx family of relay arrangements available from Texas Instruments, Inc.

Typically, a solid state relay arrangement 204 such as a monolithic integrated N-channel twin well FET may effectively replace multiple, as for example approximately N+1, EMRs used in a telecom wireline protection scheme on a line card such as line card 200. Hence, the amount of space occupied on line card 200 by circuitry used to perform protection switching is substantially less when solid state relay arrangements 204 are used.

In general, solid state relays have relatively insignificant electron migration, or current leakage. When the number of shared lines or paths in a relatively high density line card is high, however, the leakage current may build up, thereby potentially causing the solid state relay to turn on when backplane signals associated with the line card are powered up. That is, leakage current may be sufficient to bias on the solid state relay during hot insertion of the line card. The biasing on of the solid state relay may disrupt other line card signals within a protection group that may be in the process of carrying live traffic. In order to substantially minimize the amount of leakage current, additional relays may be between ground and the solid state relay and between −3.6 volts (V) and the solid state relay, i.e., between power rails of the solid state relay. That is, power isolation circuitry may be implemented in conjunction with a solid state relay in order to reduce the likelihood of leakage current causing the solid state relay to bias on by providing a relatively high impedance.

Solid state relays may also be biased due to factors other than current leakage. When solid state relays on a line card are not powered up, high frequency transients on a line card may turn the solid state relays on during a hot insertion of the line card. To prevent high frequency transients from turning on the solid state relays, clamp diodes may be added to each input line to the solid state relays.

Figure 3:
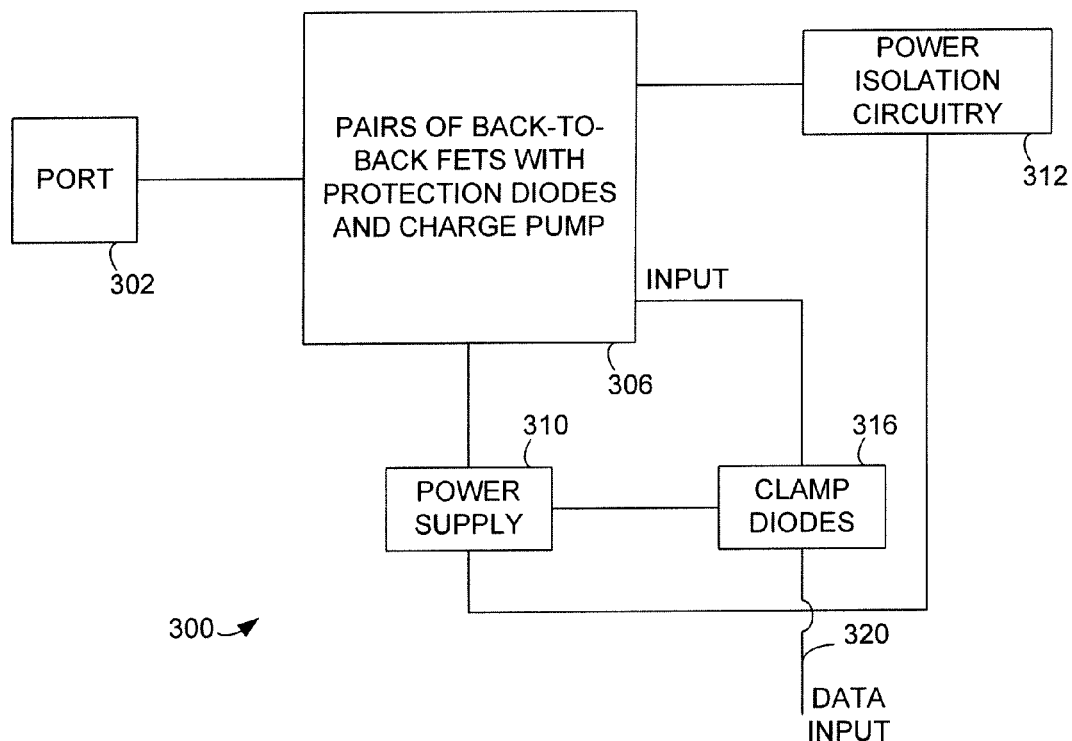
FIG. 3 is a block diagram representation of additional circuitry used in conjunction with a solid state relay arrangement in accordance with an embodiment.

Circuitry such as circuitry associated with additional relays and circuitry associated with clamp diodes is typically used in addition to solid state relays to provide power isolation to limit the amount of leakage current associated with the solid state relays, and to reduce the effect of high frequency transients, respectively. FIG. 3 is a block diagram representation of additional circuitry used in conjunction with a solid state relay arrangement in accordance with an embodiment. A port 302 of a line card 300 is in communication with a solid state relay arrangement 306 which provides protection switching. Solid state relay arrangement 306 may generally be pairs of back to-back FETS with protection diodes and a charge pump, or solid state relay arrangement 306 may be a monolithic integrated N-channel twin well FET device.

Power isolation circuitry 312 is used to provide power isolation for solid state relay arrangement 306. While power isolation circuitry 312 may include a plurality of N-channel FETs located between a power supply 312 and solid state relay arrangement 306, power isolation circuitry may instead include a single EMR which serves the purpose of a plurality of N-channel FETs. A schematic of circuitry which uses a plurality of N-channel FETs to provide power isolation for a solid state relay arrangement will be described below with respect to FIG. 5, while a schematic of circuitry which uses an EMR, e.g., a DPDT EMR, to provide power isolation for a solid state relay arrangement will be described below with respect to FIG. 6.

A data input line 320 into solid state relay arrangement 306 is coupled to clamp diodes 316 which, in turn, are coupled to power supply 310. Clamp diodes 310 are arranged to prevent high frequency transients from turning on solid state relay arrangement 306. Such clamp diodes 310, or external clamp diodes, to voltages that define a common mode window of the greatest bipolar signal prevent other line cards, i.e., line cards that are used in a platform with line card 300, from interfering with data input 320, as will be appreciated by those skilled in the art. In one embodiment, clamp diodes 316 include a clamp diode that is coupled to an approximately +3.6 V source and a clamp diode that is coupled to an approximately −3.6V source to effectively define a common mode window. It should be appreciated that although only a single data input line 320 is shown as being provided to solid state relay arrangement 306 within line card 300, more than one data input line is typically provided as input to solid state relay arrangement 306, with each data input line being coupled to its own clamp diodes.

Figure 4:
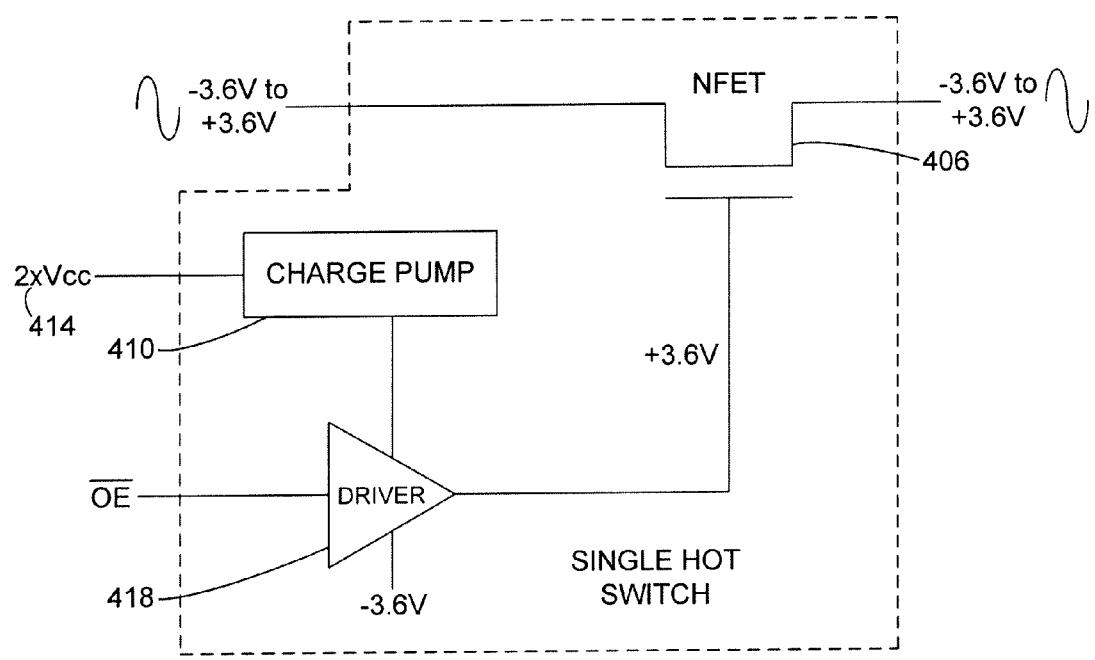
FIG. 4 is a block diagram representation of a portion of a solid state relay arrangement in accordance with an embodiment.

Solid state relay arrangement 306, as previously mentioned, generally includes pairs of back-to-back FETs, as well as protection diodes and a charge pump. One embodiment of solid state relay arrangement 306 is illustrated in FIG. 4. FIG. 4 is a block diagram representation of a portion of a solid state relay arrangement in accordance with an embodiment. An N-channel FET 406 is driven by a driver 418 which is coupled to a charge pump 410. Charge pump 410 has a voltage 414 of approximately twice a control voltage.

Figure 5:
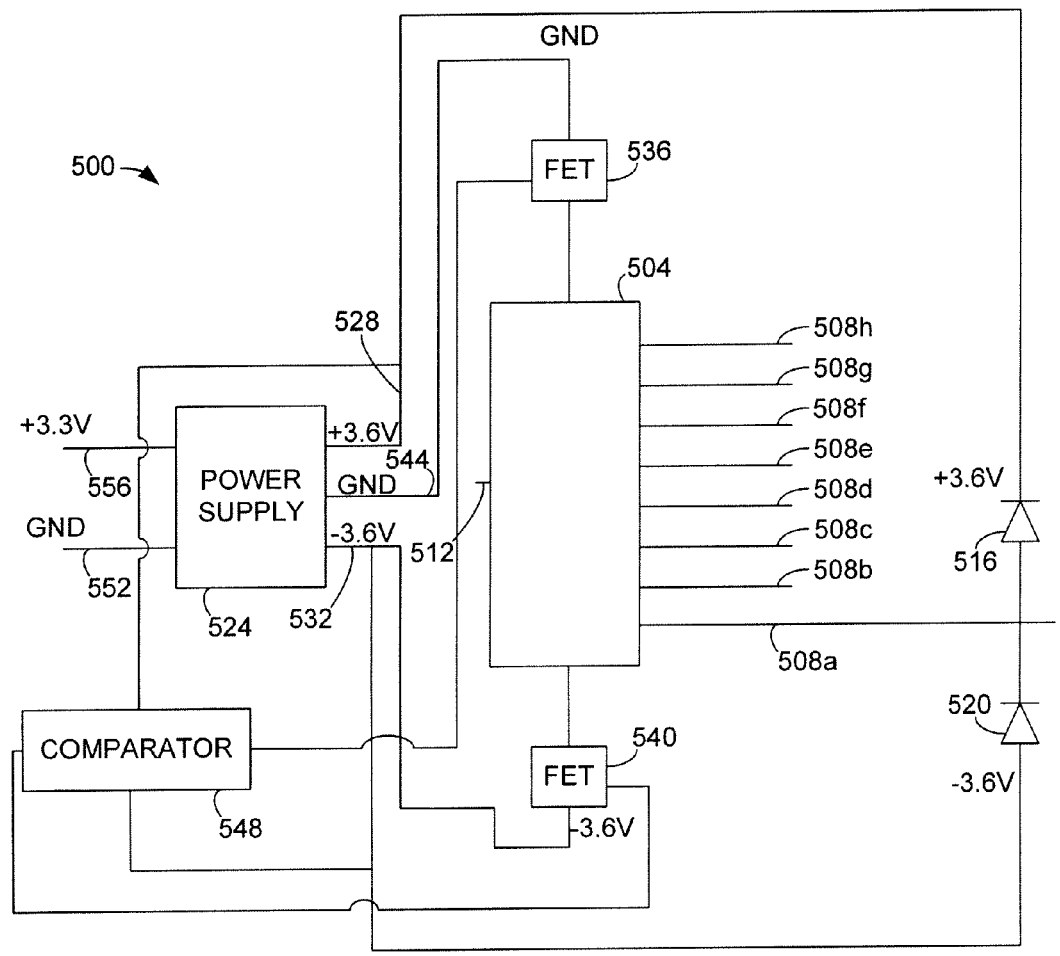
FIG. 5 is a schematic representation of circuitry associated with one implementation of a protection scheme for a telecom wireline application that utilizes a solid state relay arrangement in accordance with an embodiment.

FIG. 5 is a schematic representation of circuitry associated with one implementation of a protection scheme for a telecom wireline application that utilizes a solid state relay arrangement in accordance with an embodiment. A circuit 500 includes a solid state relay arrangement 504 which is arranged to effectively multiplex eight input lines 508a-h into a single output line 512. Single output line 512 is generally coupled to an output port (not shown), or an input port line interface unit. Input line 508a is coupled to a clamp diode 516 which is coupled to an approximately +3.6 Volt power line 528 of a power supply 524, and to a clamp diode 520 which is coupled to an approximately −3.6 Volt power line 532 of power supply 524. That is, input line 508a is associated with a common mode window. Power supply 524 is coupled to a "board" supply 556 of approximately +3.3 Volts and to a "board" ground 552.

Although each input line 508b-h is also coupled to clamp diodes, only clamp diodes 516, 520 associated with input line 508a are shown for ease of illustration. Such clamp diodes such as clamp diodes 516, 520 are arranged to be effectively connected to a substantially maximum common mode window of approximately plus or minus four volts, e.g., approximately plus or minus 3.6 Volts.

Solid state relay arrangement 504 may generally include pairs of back-to-back FETs with protection diodes and a charge pump. An n-channel FET 536 is coupled between a ground 544 of power supply 524, or a positive rail, and solid state relay arrangement 504, while an n-channel FET 540 is coupled between approximately −3.6 Volt power line 532, or a negative rail, and solid state relay arrangement 504. Hence, solid state relay arrangement 504 is effectively used between ground 544 and approximately −3.6 Volt power line 532 to effectively pass a signal swing from between approximately −3.6 Volts and approximately +3.6 Volts. FETs 536, 540 serve as power isolation circuitry that isolates solid state relay arrangement 504 by reducing, or substantially eliminating, the leakage current to effective prevent solid state relay arrangement 504 from being biased on during a hot insertion.

A comparator 548 is tied to approximately +3.6 Volt line 528 and to approximately −3.6 Volt line 532, and effectively compares the voltages, as for example during a power up process. In one embodiment, comparator 548, which serves as a voltage monitor chip, may be a microprocessor reset chip. Comparator 548 is arranged to turn on FET 536 and FET 540 at such time as a power up process is completed. When FET 536 and FET 540 are not turned on, leakage current is unable to turn on solid state relay arrangement 504. Once FET 536 and FET 540 are turned on by comparator 548, thereby enabling solid state relay arrangement 504 to function.

Figure 6:
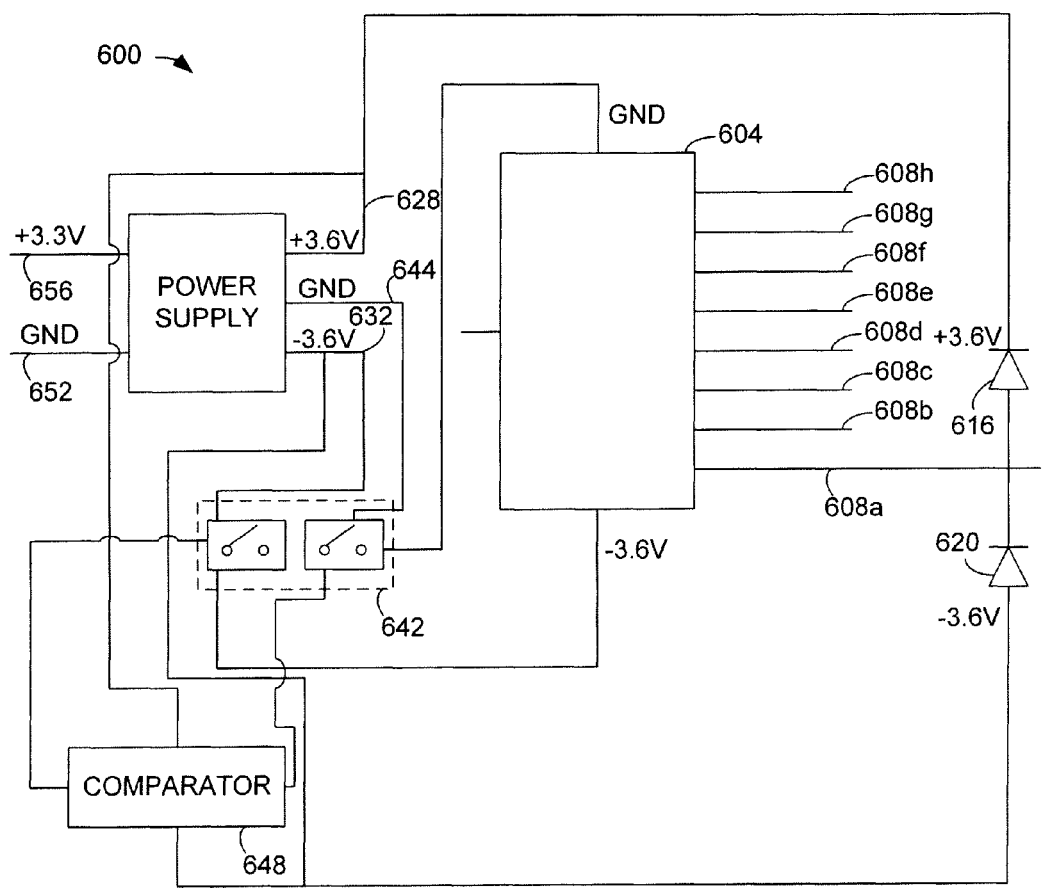
FIG. 6 is a schematic representation of circuitry associated with an implementation of a solid state relay arrangement with a DPDT EMR for power isolation within a protection scheme of a telecom wireline application in accordance with an embodiment.

While FETs 536, 540, in cooperation with comparator 548, are effective in providing power isolation for solid state relay arrangement 504, other components may be used in lieu of FETs 536, 540 to provide power isolation. By way of example, a single DPDT EMR may be implemented as a part of a power isolation circuit that isolates a solid state relay arrangement. FIG. 6 is a schematic representation of circuitry associated with an implementation of a solid state relay arrangement with a DPDT EMR for power isolation within a protection scheme of a telecom wireline application in accordance with an embodiment. A circuit 600 includes a solid state relay arrangement 604 which is arranged to effectively multiplex eight input lines 608a-h into a single output line 612. Although not shown for ease of illustrations, input lines 608a-h are each coupled to a clamp diode which is associated with an approximately +3.6 Volt power line 628 of a power supply 624, and to a clamp diode which is coupled to an approximately −3.6 Volt power line 632 of power supply 624. By way of example, as shown, input line 608a is substantially coupled to a clamp diode 616 and to a clamp diode 620. Power supply 624 is coupled to a "board" supply 656 of approximately +3.3 Volts and to a "board" ground 652.

As discussed above, solid state relay arrangement 604 may generally include pairs of back-to-back FETs with protection diodes and a charge pump. A DPDT EMR 642 is arranged as power isolation circuitry that isolates solid state relay arrangement 604 by substantially preventing solid state relay arrangement 604 from being biased on during a hot insertion. As shown, DPDT EMR 642 is arranged on both ground line 644, or a positive rail, and approximately −3.6 Volt line 632, or a negative rail. A comparator 648 effectively compares the voltages, and serves as a voltage monitor chip. Comparator 648 is arranged to turn on DPDT EMR 642 when a power up process is completed. It should be appreciated that when DPDT EMR 642 is turned on, the two switches typically included in DPDT EMR 642 are both turned on at substantially the same time.

Figure 7:
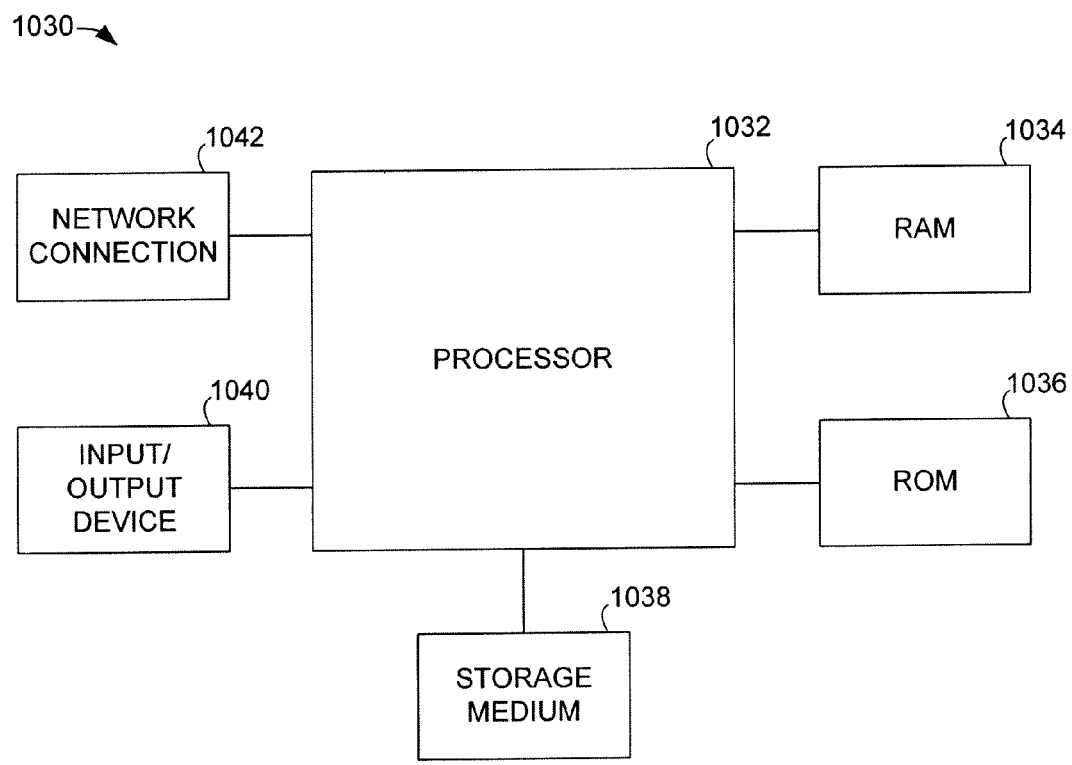
FIG. 7 illustrates a typical, general purpose computing device or computer system on which a protection scheme may be implemented.

A protection scheme which utilizes a solid state relay arrangement as discussed above may be implemented on line cards which are suitable for use in optical network systems such as telecom or datacom systems with electrical line interfaces. In one embodiment, the protection scheme may be implemented on line cards of a multiservice platform which has electrical-to-optical interfaces. FIG. 7 illustrates a typical, general purpose computing device or computer system on which a line card with a protection scheme may be utilized. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments have been described, it should be understood that the techniques described herein may be embodied in many other specific forms without departing from the spirit or the scope of the claims. By way of example, while the techniques have generally been described as being suitable for use in a 1:8 protection scheme for electrical ports, the techniques may be implemented for substantially any 1:N protection scheme.

A solid state relay arrangement may be used to implement a protection scheme on a variety of different line cards which may be installed in optical network devices such as routers. The types of line cards may include, but are not limited to, DS1 line cards, E1 line cards, DS3 line cards, STM0E line cards, STM1E line cards, T1 line cards, E3 line cards, and T3 line cards.

While the use of a solid state relay arrangement in a protection scheme is useful in reducing the amount of space on a line card that is occupied by circuitry which supports the protection scheme, the use of a solid state relay arrangement with power isolation circuitry may be used in a variety of other applications without departing from the spirit of the scope and range of equivalents of the claims. Therefore, the present examples are to be considered as illustrative and not restrictive, and are not to be limited to the details given herein, but may be modified within the scope of the appended claims.

What is claimed is:

1. An apparatus comprising:
   a line card electrical port configured as an output port line interface unit;
   a plurality of input lines;

an output line, the output line being coupled to the line card electrical port;
a solid state relay configured to switch the plurality of input lines into the output line, wherein the solid state relay comprises first and second power inputs;
a first switch coupled between at least one of a ground line and a positive voltage line, and the first power input to the solid state relay;
a second switch coupled between a negative voltage line and a second power input to the solid state relay;
wherein the first and second switches are configured to prevent biasing of the solid state relay; and
one or more voltage monitor chips that are configured to turn on at least one of the first and second switches when a power up process is complete.

2. The apparatus of claim 1, further comprising:
a power supply, the power supply having the positive voltage line, the negative voltage line, and the ground line.

3. The apparatus of claim 2, further comprising:
a first clamp diode, the first clamp diode being coupled to the positive voltage line and a first input line of the plurality of input lines; and
a second clamp diode, the second clamp diode being coupled to the negative voltage line and the first input line.

4. The apparatus of claim 2, wherein the positive voltage line is an approximately +3.6 Volt line and the negative voltage line is an approximately −3.6 Volt line.

5. The apparatus of claim 1, wherein the first and second switches comprise first and second field effect transistors (FETs), and wherein the one or more voltage monitor chips are configured to turn on at least one of the first and second FETs when the power up process is complete.

6. The apparatus of claim 1, wherein the first and second switches comprise first and second electromechanical relays, and wherein the one or more voltage monitor chips are configured to turn on at least one of the first and second electromechanical relays when the power up process is complete.

7. The apparatus of claim 6, wherein the first and second electromechanical relays are double pole double throw electromechanical relays.

8. The apparatus of claim 1, wherein the solid state relay is an integrated N-channel twin well FET device.

9. The apparatus of claim 1, wherein the apparatus is a line card comprising one of a T1, an E1, a T3, an E3, an STM03, an STM1E, a DS1, and a DS3 line card.

10. The apparatus of claim 1, wherein the solid state relay has a supply voltage of between ground and approximately −3.6 Volts.

11. The apparatus of claim 1, wherein the line card electrical port is configured to transport telecommunications electrical signals.

12. A method comprising:
receiving a signal on an input line of a line card having a plurality of inputs;
switching the signal to an output line using a solid state relay
providing the signal to a line card electrical port via the output line, wherein the line card electrical port is configured as an output port line interface unit;
protecting power inputs of the solid state relay using a first switch coupled between at least one of a ground line and a positive voltage line, and a first power input to the solid state relay, a second switch coupled between a negative voltage line and a second power input to the solid state relay, and one or more voltage monitor chips that are configured to turn on at least one of the first and second switches when a power up process is complete; and
preventing biasing of the solid state relay using the first and second switches.

13. The method of claim 12, further comprising clamping the input line using a first clamp diode coupled to the positive voltage line and a second clamp diode coupled to the negative voltage line, wherein the first and second clamp diodes are further coupled to the input line.

14. The method of claim 12, wherein switching the signal using the solid state relay arrangement includes multiplexing the signal.

15. The method of claim 12, wherein protecting the first and second switches comprise protecting first and second field effect transistors (FETs).

16. The method of claim 12, wherein protecting the first and second switches comprise protecting first and second electromechanical relays.

17. The method of claim 12, wherein the signal is one of T1, E1, T3, E3, STM03, STM1E, DS1, and DS3 signals.

18. The method of claim 12, wherein receiving, switching, providing and protecting are performed with respect to a telecommunication transport electrical signal.

* * * * *